(12) United States Patent
Noh

(10) Patent No.: US 6,919,940 B2
(45) Date of Patent: Jul. 19, 2005

(54) LIQUID CRYSTAL DISPLAY DEVICE AND METHOD OF FABRICATING THE SAME

(75) Inventor: Woo Yong Noh, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/606,799

(22) Filed: Jun. 27, 2003

(65) Prior Publication Data

US 2004/0125267 A1 Jul. 1, 2004

(30) Foreign Application Priority Data

Dec. 27, 2002 (KR) .............................. 10-2002-0084903

(51) Int. Cl.[7] .......................................... G02F 1/1333
(52) U.S. Cl. ........................................................ 349/58
(58) Field of Search ........................................... 349/58

(56) References Cited

U.S. PATENT DOCUMENTS

| | | | | |
|---|---|---|---|---|
| 5,299,043 A | * | 3/1994 | Taylor et al. ................. | 349/58 |
| 5,659,376 A | * | 8/1997 | Uehara et al. ................. | 349/58 |
| 5,666,172 A | * | 9/1997 | Ida et al. ........................ | 349/58 |
| 5,703,665 A | * | 12/1997 | Muramatsu et al. ........... | 349/60 |
| 5,929,950 A | * | 7/1999 | Matsuda ........................ | 349/60 |
| 6,064,455 A | * | 5/2000 | Kim ............................. | 349/113 |
| 6,166,788 A | * | 12/2000 | Ha et al. ........................ | 349/58 |
| 6,292,239 B1 | * | 9/2001 | Nagamura et al. ............ | 349/58 |
| 6,392,723 B1 | * | 5/2002 | Sugiyama et al. ............. | 349/58 |
| 6,639,635 B2 | * | 10/2003 | Wang ............................ | 349/58 |
| 6,654,078 B1 | * | 11/2003 | Kato et al. ..................... | 349/58 |
| 2003/0058380 A1 | * | 3/2003 | Kim et al. ..................... | 349/58 |
| 2004/0141102 A1 | * | 7/2004 | Lin ............................... | 349/58 |

* cited by examiner

*Primary Examiner*—James A. Dudek
(74) *Attorney, Agent, or Firm*—Morgan, Lewis & Bockius LLP

(57) ABSTRACT

A liquid crystal display device includes a back-light assembly for radiating light onto a liquid crystal panel, a main frame having a hook protrusion formed along an upper part for mounting the back-light assembly and the liquid crystal display panel, and a case-top having a plurality of hook plates positioned adjacent to the hook protrusion of the main frame, wherein the case-top includes a bent portions enclosing an edge portion of the liquid crystal display panel and a side portion of the main frame.

12 Claims, 5 Drawing Sheets

LIQUID CRYSTAL DISPLAY DEVICE AND METHOD OF FABRICATING THE SAME

The present invention claims the benefit of Korean Patent Application No. P2002-84903 filed in Korea on Dec. 27, 2003, which is hereby incorporated by reference.

BACKGROUND OF THE INVENTION

1. Field of the Invention

The present invention relates to a display device and a method of fabricating a display device, and more particularly to a liquid crystal display device and a method of fabricating a liquid crystal display device.

2. Description of the Related Art

In general, liquid crystal display modules used as monitors in notebook and personal computers include a back-light assembly comprising a plurality of optical sheets, a light guide panel, a reflection sheet, and a liquid crystal display panel having a liquid crystal material injected between two glass substrates, wherein one of the glass substrates has liquid crystal pixel cells disposed in a matrix configuration. The back-light assembly and the liquid crystal display panel are stacked and separated in an upper part of a main frame, wherein the liquid crystal display panel is mounted in a case-top to be fixed onto the back-light assembly.

FIG. 1 is a plan view of a liquid crystal display panel and a case-top of a liquid crystal display device according to the related art, and FIG. 2 is a cross sectional view along I–I' of FIG. 1 according to the related art. In FIGS. 1 and 2, a back-light assembly 58 and a liquid crystal display panel 66 are provided on an upper part of a main frame 54, wherein the liquid crystal display panel 66 is stacked on the back-light assembly 58 and pressed into the case-top 50.

The back-light assembly 58 is provided on the upper part of the main frame 54, and a hook protrusion 54a is provided along facing sides of the main frame 54 to enclose sides of the back-light assembly 58 and extends along a vertical direction corresponding to a height of the back-light assembly. One side of the hook protrusion 54a formed on the main frame 54 contacts a side portion of a panel guide support 76. The panel guide support 76 includes a protrusion 76b formed to extend along the vertical direction at a location separate from the hook protrusion 54a and adjacent to the liquid crystal display panel 66a, and a liquid crystal display panel mounting part 76a formed to extend along the horizontal direction between the liquid crystal display panel 66 and the back-light assembly 58. The back-light assembly 58 includes overlapping optical sheets 64, wherein a protrusion 54b of the main frame penetrate through and edge portion of the optical sheets 64, and a reflection sheet 60 that is mounted between bottom and side portions of the main frame 54 and lower and side surfaces of a light guide panel 62. Although not shown, the back-light assembly 58 includes a light source for radiating light to the light guide panel 52.

The liquid crystal display panel 66, which includes two glass substrates 68 and 70, is mounted on an upper part of the panel mounting part 76a of the panel guide support 76. In addition, first and second polarization plates 72 and 74 are mounted on surfaces of the two glass substrates 68 and 70, respectively.

End parts of the case-top 50 and the end parts of the glass substrates 68 and 70 of the liquid crystal display panel 66 must allow for removal of the case-top 50 without physically impacting the liquid crystal display panel 66. For example, as shown in FIG. 1, an overlapping amount between the case top 50 and the liquid crystal display panel 66 is set to about 1.4 mm to 1.9 mm. Accordingly, it is very difficult to remove the case-top 50 without causing damage to the liquid crystal display panel 66. In addition, the polarization plate 72 is easily damaged during removal of the case-top 50.

SUMMARY OF THE INVENTION

Accordingly, the present invention is directed to a liquid crystal display device and a method of fabricating a liquid crystal display device that substantially obviates one or more of the problems due to limitations and disadvantages of the related art.

An object of the present invention is to provide a liquid crystal display device having minimized overlap between a case-top and a liquid crystal display panel.

Another object of the present invention is to provide a method of fabricating a liquid crystal display device having minimized overlap between a case-top and a liquid crystal display panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a back-light assembly for radiating light onto a liquid crystal panel, a main frame having a hook protrusion formed along an upper part for mounting the back-light assembly and the liquid crystal display panel, and a case-top having a plurality of hook plates positioned adjacent to the hook protrusion of the main frame, wherein the case-top includes a bent portions enclosing an edge portion of the liquid crystal display panel and a side portion of the main frame.

In another aspect, a method of fabricating a liquid crystal display device includes forming a back-light assembly for radiating light onto a liquid crystal panel, forming a main frame having a hook protrusion formed along an upper part for mounting the back-light assembly and the liquid crystal display panel, and forming a case-top having a plurality of hook plates positioned adjacent to the hook protrusion of the main frame, wherein the case-top includes a bent portion enclosing an edge portion of the liquid crystal display panel and a side portion of the main frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
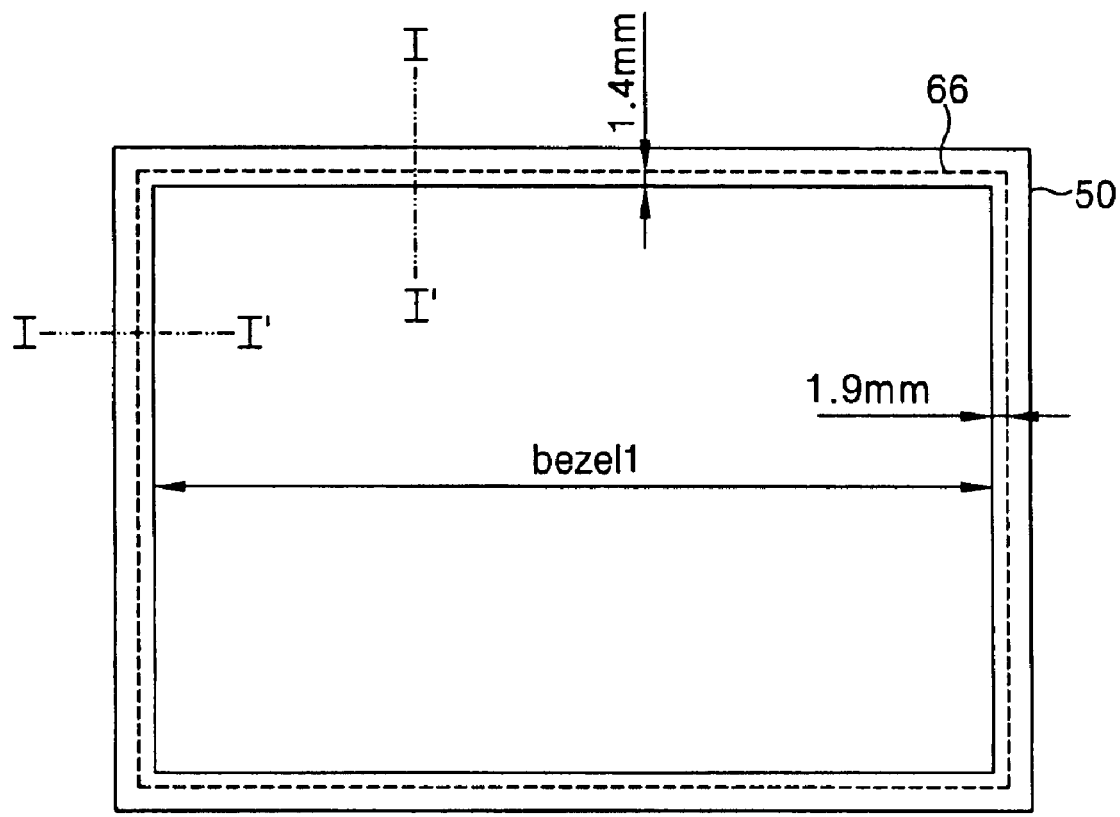
FIG. 1 is a plan view of a liquid crystal display panel and a case-top of a liquid crystal display device according to the related art.
Figure 2:
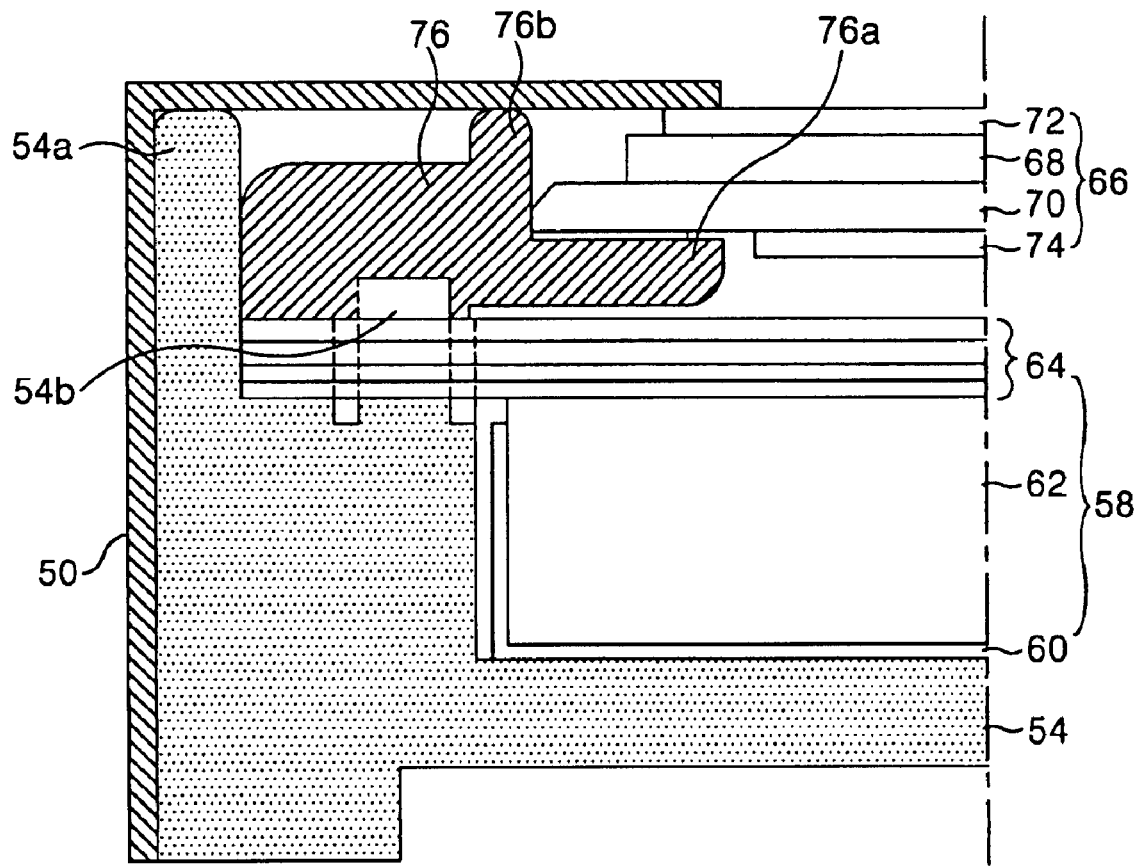
FIG. 2 is a cross sectional view along I–I' of FIG. 1 according to the related art.
Figure 3:
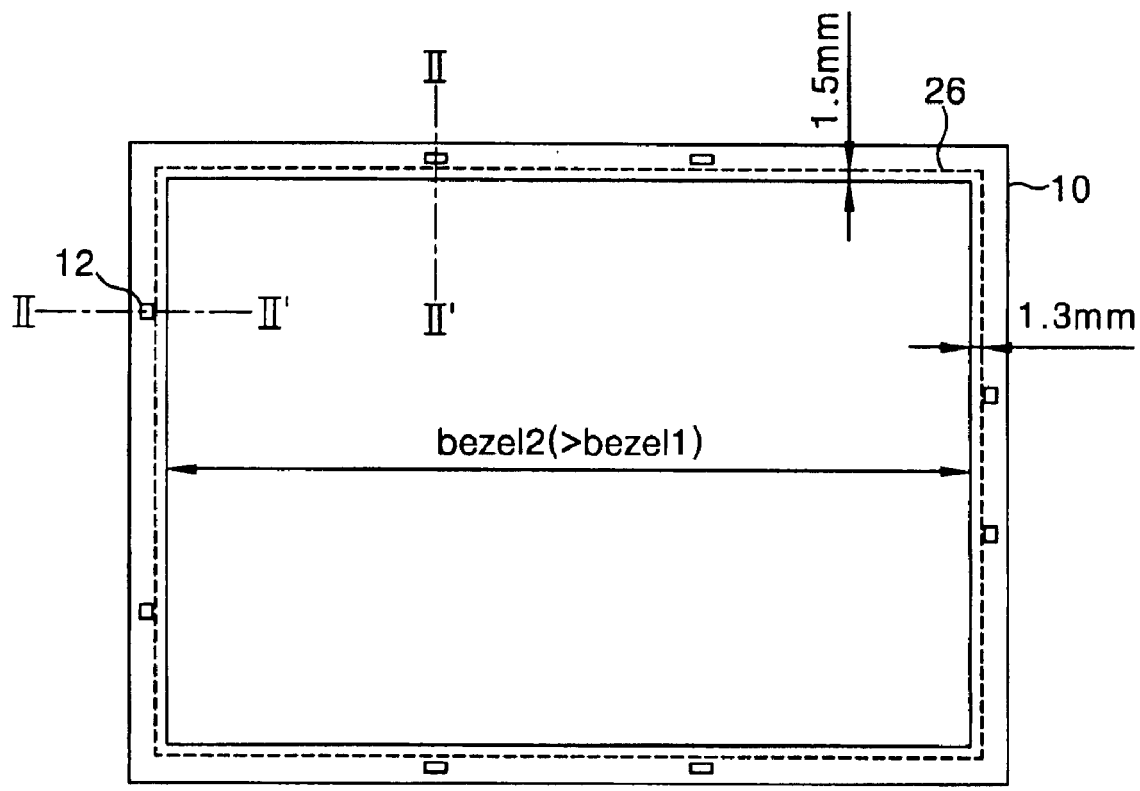
FIG. 3 is a plan view of an exemplary liquid crystal display panel and an exemplary case-top of a liquid crystal display device according to the present invention.
Figure 4:
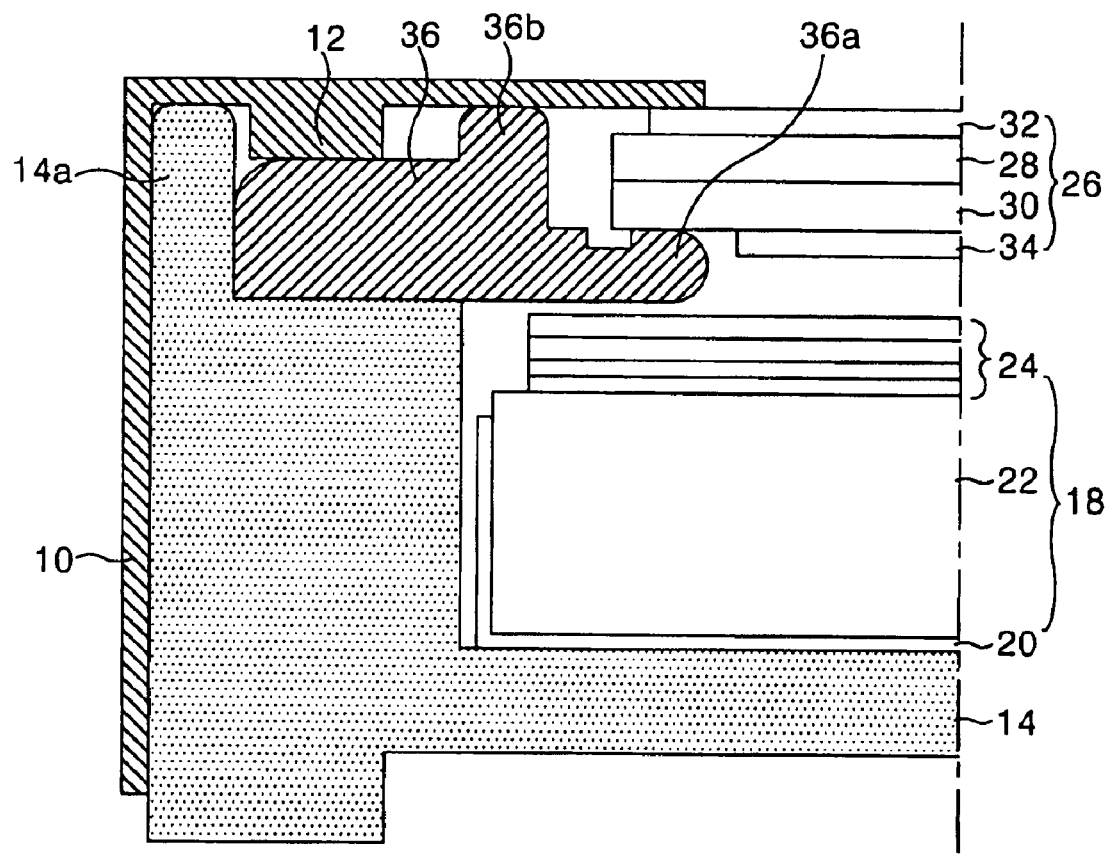
FIG. 4 is a cross sectional view along II–II' of FIG. 3 according to the present invention.

FIG. 3 is a plan view of an exemplary liquid crystal display panel and an exemplary case-top of a liquid crystal display device according to the present invention, and FIG. 4 is a cross sectional view along II–II' of FIG. 3 according to the present invention. In FIGS. 3 and 4, a liquid crystal display panel 26 and case-top 10 may include a plurality of hook plates 12 that protrude along a downward direction. The hook plates 12 may be formed along a perimeter portion of the case-top 10 at equal intervals. Alternatively, the plates 12 may be formed along a perimeter portion of the case-top 10 at non-equal intervals. Sides of each of the hook plates 12 may face side portions of a plurality of hook protrusions 14a formed in an upper part of a main frame 14. Accordingly, if the hook plates 12 of the case-top 10 face the hook protrusions 14a formed in the upper part of the main frame 14, contact with first and second glass substrates 28 and 30 may be minimized. For example, an overlap between the upper polarization plate 32 of the liquid crystal display panel 26 and the case-top 10 may be about 1.15 mm to 1.3 mm.

In FIG. 4, a back-light assembly 18 is mounted in an upper part of the main frame 14, wherein a hook protrusion 14a is formed to extend along the vertical direction corresponding to a height of the back-light assembly 18 and the liquid crystal display panel 26. In addition, a panel guide support 36 is provided between the main frame 14, the case-top 10, and the liquid crystal display panel 26. Accordingly, the panel guide support 36 includes a protrusion 36b extending along the vertical direction at a location separate from the hook protrusion 14a, and a mounting part 36a that extends along the horizontal direction between the back-light assembly 8 and the liquid crystal display panel 26. Although the main frame 14 may be fabricated using molding material(s), the main frame 14 may include metal material(s) having heat resistant properties, such as aluminum and aluminum alloys.

The back-light assembly 18 may include overlapping optical sheets 24, wherein a the mounting part 36a of the panel guide support 36 may be provided between edge portions of the optical sheets 24, and a reflection sheet 20 that may be provided between bottom and side portions of the main frame 14 and lower and side surfaces of a light guide panel 22. Although not shown, the back-light assembly 18 may include a light source for radiating light to the light guide panel 22.

Figure 5:
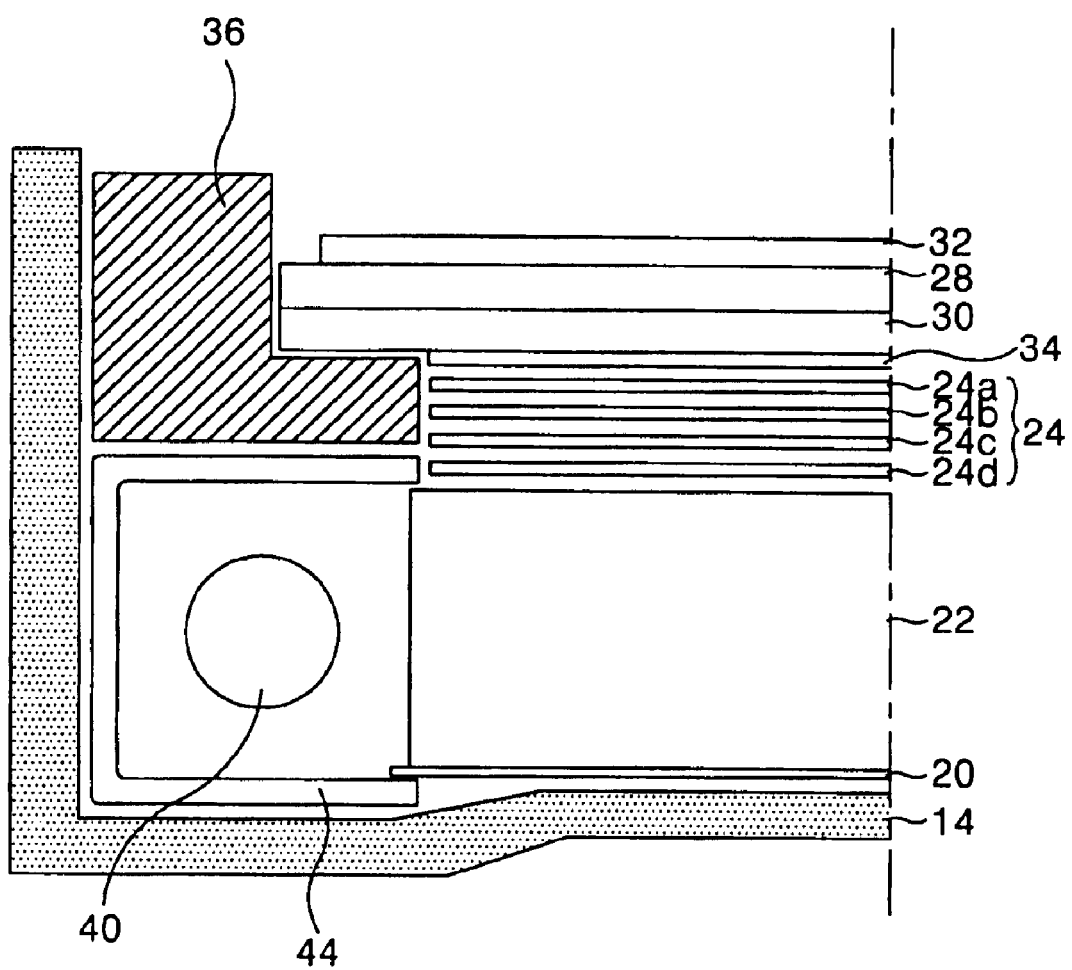
FIG. 5 is a cross sectional view of an exemplary back-light assembly according to the present invention.

FIG. 5 is a cross sectional view of an exemplary back-light assembly according to the present invention. In FIG. 5, a back-light assembly may include a reflection sheet 20, a light guide panel 22, optical sheets 24, a lamp 40 that faces an incident surface of the light guide panel 22, and a lamp reflection plate 44 for improving efficiency of light radiated from the lamp 40 to the light guide panel 22. The optical sheets 24 may include a diffusion sheet 24a, prism sheets 24b and 24c, and a protection sheet 24d. A liquid crystal display panel having two glass substrate 28 and 30 may be mounted in an upper part of a panel guide support 36. In addition, polarization plates 32 and 34 may be provided on the two glass substrates 28 and 30.

In FIG. 4, when the back-light assembly 18 and the liquid crystal display panel 26 are stacked in the upper part of the main frame 14 and the panel guide support 36 and the case-top 10 are to be inserted into the upper part of the main frame 14, the hook plate 12 formed at the upper part of the case-top 10 is located between the hook protrusion 14a of the main frame 14 and the protrusion 36b of the panel guide support 36. Accordingly, since the hook plate 12 is restricted between the hook protrusion 14a and the protrusion 36b, movement of the case-top 10 is restrained.

In addition, the case-top 10 includes an "L-shaped" bent portion that overlaps edge portions of the liquid crystal display panel 26 and encloses sides of the main frame 14. Accordingly, overlap between the case-top 10 and the liquid crystal display panel 26 may be reduced to about 1.15 mm to 1.3 mm. Thus, movement of the case-top 10 may be restricted while reducing the overlap between the case-top 10 and the liquid crystal display panel 26. For example, a vertical overlap between the case-top 10 and the liquid crystal display panel 26 may be about 1.3 mm along a vertical direction, and a horizontal overlap between the case-top 10 and the liquid crystal display panel 26 along a horiztonal direction may be about 1.5 mm.

In addition, after the back-light assembly 18 and the liquid crystal display panel 26 are stacked in the upper part of the main frame 14, and the case-top 10 is combined with the main frame 14 by the hook plate 12, the mainframe 14 and the case-top 10 may be fastened together using fasteners (not shown), such as screws, and may include a cover shield (not shown) that encloses the case-top 10 and the main frame 14.

According to the present invention, since the hook plate formed within the case-top may be affixed at a hook protrusion formed in a main frame and may be used as a supporter for stacking a back-light assembly and a liquid crystal display panel, overlap between a case-top and the liquid crystal display panel may be minimized while restraining movement of the case-top. Accordingly, a display screen of the liquid crystal display panel may be widened, and damage to polarization sheets of the back-light assembly may be prevented.

It will be apparent to those skilled in the art that various modifications and variations can be made in the liquid crystal display device and method of fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a back-light assembly for radiating light onto a liquid crystal panel;
   a main frame having a hook protrusion formed along an upper part for mounting the back-light assembly and the liquid crystal display panel; and
   a case-top having a plurality of hook plates positioned adjacent to the hook protrusion of the main frame, side portions of the hook plates face side portions of the hook protrusion,
   wherein the case-top includes a bent portions enclosing an edge portion of the liquid crystal display panel and a side portion of the main frame.

2. The device according to claim 1, further comprising a panel guide support having a first protrusion extending between the liquid crystal display panel and the back-light assembly, a second protrusion extending between the plurality of hook plates and the liquid crystal display panel, and a third protrusion extending between the main frame and the plurality of hook plates.

3. The device according to claim 2, wherein the first protrusion contacts the liquid crystal display panel, the second protrusion contacts the case-top, and the third protrusion contacts the plurality of hook plates and the main frame.

4. The device according to claim 2, wherein the liquid crystal display panel is mounted on the first protrusion of the panel guide support.

5. The device according to claim 2, wherein a portion of the case-top extends over a side portion of the liquid crystal display panel by a first distance and second distance.

6. The device according to claim 5, wherein the first distance is about 1.3 mm and the second distance is about 1.5 mm.

7. A method of fabricating a liquid crystal display device, comprising:

forming a back-light assembly for radiating light onto a liquid crystal panel;

forming a main frame having a hook protrusion formed along an upper part for mounting the back-light assembly and the liquid crystal display panel; and forming a case-top having a plurality of hook plates positioned adjacent to the hook protrusion of the main frame, side portions of the hook plates face side portions of the hook protrusion, wherein the case-top includes a bent portion enclosing an edge portion of the liquid crystal display panel and a side portion of the main frame.

8. The method according to claim 7, further comprising forming a panel guide support having a first protrusion extending between the liquid crystal display panel and the back-light assembly, a second protrusion extending between the plurality of hook plates and the liquid crystal display panel, and a third protrusion extending between the main frame and the plurality of hook plates.

9. The method according to claim 8, wherein the first protrusion contacts the liquid crystal display panel, the second protrusion contacts the case-top, and the third protrusion contacts the plurality of hook plates and the main frame.

10. The method according to claim 8, wherein the liquid crystal display panel is mounted on the first protrusion of the panel guide support.

11. The method according to claim 8, wherein a portion of the case-top extends over a side portion of the liquid crystal display panel by a first distance and second distance.

12. The method according to claim 11, wherein the first distance is about 1.3 mm and the second distance is about 1.5 mm.

* * * * *